(12) United States Patent
Celebi

(10) Patent No.: US 6,782,042 B1
(45) Date of Patent: Aug. 24, 2004

(54) METHODS AND DEVICES FOR SIMPLIFYING BLIND CHANNEL ESTIMATION OF THE CHANNEL IMPULSE RESPONSE FOR A DMT SIGNAL

(75) Inventor: Samel Celebi, Little Falls, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/501,984

(22) Filed: Feb. 11, 2000

(51) Int. Cl.[7] .......................... H04B 1/38; H04L 27/28
(52) U.S. Cl. ........................ 375/222; 375/260
(58) Field of Search ............................. 375/219, 222, 375/259, 260, 377

(56) References Cited

U.S. PATENT DOCUMENTS 6,084,906 A * 7/2000 Kao et al. .................. 375/220

6,144,937 A * 11/2000 Ali ............................. 704/233

OTHER PUBLICATIONS

Muquet et al., Blind and Semi-Blind Channel Identification Methods Using Second Order Statistics for OFDM Systems. Mar. 1999. IEEE International Conference on Acoustics, Speech, and Signal Processing. vol. 5, pp. 2745-2748.*

* cited by examiner

Primary Examiner—Stephen Chin
Assistant Examiner—David B. Lugo

(57) ABSTRACT

Blind channel estimates of the impulse response of a channel are determined for discrete multitone modulated ("DMT") signals. Novel methods and devices used to complete the estimates make use of an autocorrelation function instead of solving for a set of linear, simultaneous equations. The estimates are further simplified by taking into account the cyclostationary nature of DMT signals and can be embodied in hardware/software used in digital subscriber loop ("DSL") modems and the like. Both static and time-varying estimates can be made.

53 Claims, 2 Drawing Sheets

METHODS AND DEVICES FOR SIMPLIFYING BLIND CHANNEL ESTIMATION OF THE CHANNEL IMPULSE RESPONSE FOR A DMT SIGNAL

BACKGROUND OF THE INVENTION

The Internet is upon us. Millions of people access the Internet each day to download information stored on remote computers about everything from their health to their wealth. As anyone who has ever used the Internet knows (hereafter these people will be referred to as "users"), it sometimes takes a while for information to be transmitted from such remote computers to a user's computer. In the case of video or image information, the wait can be very long. Much of the wait is due to the fact that information is still sent using relatively slow speeds, e.g. less than 56K bits /sec. Reacting to consumer and business demands for faster transmission of information, techniques have been developed to transmit information at higher speeds or more efficiently. One such method which has been developed uses DSL signals and equipment instead of standard telephone signals and equipment. Together the signals and equipment comprise a DSL "line." Many telephone companies now offer DSL lines to businesses and consumers who are interested in avoiding the "waiting game" described above.

A common way to transmit and receive information over a DSL line is to use DMT signals. A transceiver which is designed to transmit and receive DMT signals is referred to as a DMT transceiver.

A DSL line can be thought of as a "communication channel" through which information is transmitted, received, re-transmitted and re-received. In order for one DMT transceiver to correctly extract and reconstruct a signal sent from another DMT transceiver, it is important for the receiving transceiver to know as much as possible about the communication channel through which the signal has passed. One parameter which is often used by DMT transceivers to characterize a communication channel is referred to as the "impulse response" of a channel.

For the most part, there are two ways to measure the impulse response of a communication channel; using a reference signal or using a "blind channel" estimation method. The first technique requires the transmission of a separate "training" or reference signal between each transceiver. This reference signal is used to determine the impulse response of the channel of interest. One example of a reference signal is a signal which comprises a pseudorandom sequence of digital bits. Once the impulse response of a given channel is estimated it can be used by one DMT transceiver to reconstruct signals originally transmitted by another DMT transceiver. Generally, the impulse response of a given communication channel can be determined faster (i.e., in less time) using a reference signal than using a blind channel estimation method. The drawback of the reference signal method, however, is that it requires the generation and use of a separate reference signal. A DMT transceiver which determines impulse response using a reference signal is usually more expensive than one that uses a blind channel estimation method. In addition, there exists circumstances where it is impractical to use a separate reference signal regardless of cost. In still other instances, the transmission, reception and re-transmission of a reference signal may become impaired due to the failure of a return path channel.

Given the drawbacks and circumstances just described, manufacturers would like to incorporate blind channel estimation methods into their DMT transceivers. Up until now, existing blind channel estimation methods have been expensive to implement as well. Much of this expense is due to the fact that existing estimation methods require the solution of a set of linear, simultaneous equations. These equations involve complex mathematical operations such as division, square-rooting and matrix inversion. To complete these types of operations, complex and expensive hardwaresoftware is required. In contrast, the hardware/software commonly used in existing DMT transceivers (e.g., fixed point arithmetic circuitry) is relatively inexpensive and not capable of completing such operations. Understandably, manufacturers have been reluctant to incorporate the type of hardware/software required to complete such complex operations into their DMT transceivers in order to avoid the associated higher costs which come along with such a choice.

It is believed that simplifying the type of operations used to complete blind channel estimates of the channel impulse response of a communication channel for a DMT signal will lead to lower cost DMT transceivers.

Accordingly, it is desirable to provide methods and devices for simplifying the type of operations used to complete blind channel estimates of the channel impulse response for a DMT signal.

SUMMARY OF THE INVENTION

In accordance with the present invention there are provided methods and devices for completing blind channel estimates of the channel impulse response for a DMT signal. Novel devices comprise an arithmetic unit adapted to estimate the impulse response using an autocorrelation function of a received signal. Other devices/arithmetic units make use of the autocorrelation function to further simplify the estimation of the impulse response. The impulse response of both static and time-varying channels can be determined using devices envisioned by the present invention. Optionally, each of these devices may comprise a receiving unit adapted to receive a DMT signal and a memory unit adapted to store at least the autocorrelation function. Some examples of such a device are a DMT modem, a DSL modem, a digital signal processor or digital signal processor chip set. The device may also be realized as fixed point arithmetic circuitry.

In addition to devices, the present invention also envisions programmable mediums, such as floppy disks, optical disks and other memory devices for storing program code written in a form known in the art and methods for carrying out the features and functions of the present invention.

The present invention and its advantages can be best understood with reference to the drawings, detailed description of the invention and claims that follow.

DETAILED DESCRIPTION OF THE INVENTION

Figure 1:
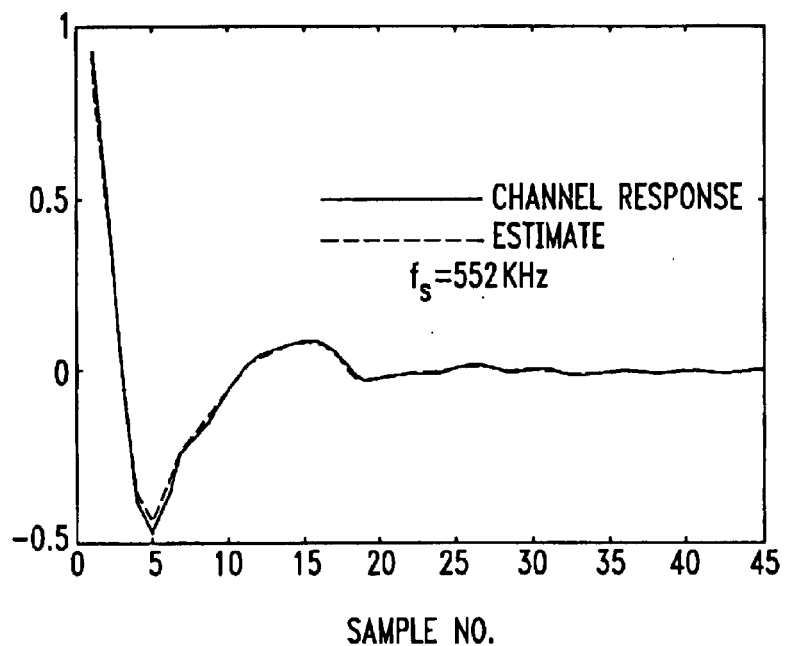
FIG. 1 shows a comparison of blind channel estimates of the impulse response of a test channel for a DMT signal completed using one embodiment of the present invention versus estimates derived using a reference signal over the same channel.

A DMT transmission signal, which can be represented by the notation "x(n)", comprises a sequence of "blocks" that are transmitted sequentially. Each block comprises a series of data samples (hereafter "samples"). For example, one block may comprise 256 samples. The samples within each block of a DMT signal are arranged in a telltale fashion. The first few samples of each block, referred to as the "cyclic-prefix" by those in the art, are identical to the last few samples in the block. This is done purposefully and is a characteristic of a DMT signal. For example, if the first 16 samples of a block in a DMT signal comprises the sequence "1111111100000000", then the last 16 samples of that same block will comprise the same sequence, namely, "1111111100000000". It should be understood that the sequence just given is a simplified example of a DMT signal. Ordinarily, a DMT signal need not comprise binary samples (e.g., "1s" and "0s"). The samples might comprise real values, such as "5, −1, 2.3, 0, 4, 1.2, 0, 0", etc. Up until now, placing the identical samples at the beginning and end of a block is known to serve two purposes. The first purpose is to provide a buffer zone between adjacent blocks within a DMT signal. This helps reduce the effects of signal leakage, known as "interblock interference". Second, the use of identical samples at the beginning and end of a block makes the DMT signal appear to be a periodic signal. Such a periodic signal can be used by a DMT transceiver to correct errors introduced into the signal by the channel using, for example, Fast Fourier Transformation techniques.

Because DMT signals have identical samples at the beginning and end of each block they are said to be "cyclostationary".

The present invention makes use of the cyclostationary nature of DMT signals in a way heretofore not envisioned: to simplify the blind channel estimation of the impulse response of a channel.

In general, the impulse response of a channel can be determined from the equation:

$$y(n) = h(n) \cdot x(n) h(n) = [h_0, h_1 \ldots, h_{L-1}] \qquad (1)$$

where x(n) represents a DMT signal input into a channel, y(n) the output, h(n) the impulse response and the operator "$\otimes$" indicates that y(n) can be determined from the "convolution" of x(n) with h(n). Sometimes both x(n) and y(n) are known, other times only y(n) is known. Blind channel estimates of the channel impulse response h(n) are based solely on knowledge of the received signal y(n) only.

Existing methods attempt to estimate the impulse response h(n) given by equation (1) using a series of linear, simultaneous equations. Solving such equations requires complex hardware\software which is not usually found in a typical DMT transceiver. Recognizing this, the present invention envisions solving equation (1) using a new and novel method, namely, by using an autocorrelation function.

Using an autocorrelation function to solve equation (1) instead of linear, simultaneous equations eliminates the need to use complex hardware\software. Instead, the fixed point arithmetic hardwaresoftware now used in existing DMTs can be adapted to carry out the estimation of a channel's impulse response. More specifically, the autocorrelation function envisioned by the present invention comprises addition and multiplication operations instead of matrix inversions and divisions necessary to solve more complex linear, simultaneous equations.

Once the impulse response is estimated, it can then be used by a receiving DMT transceiver, (i.e., a receiver) to reconstruct a DMT signal sent from a transmitting DMT transceiver (i.e., a transmitter). In other words, a transceiver uses the impulse response of a channel to reconstruct a DMT signal which has been modified by the channel through which it has passed.

In an illustrative embodiment of the present invention, the autocorrelation function can be represented by the following equation:

$$R_y(k) = E\{y(iD)y(iD+N+k)\} k = 0, 1, \ldots, L-1 \qquad (2)$$

where "D" is the transmission block length and "y(iD)" is the first sample of the "ith" block of a DMT signal received by a transceiver. Equation (2) may be rewritten as:

$$R_y(k) = E\left\{\sum_m \sum_u h(m)h(u)x(iD-m)x(iD+N+K-u)\right\} \qquad (3)$$

by making the following substitutions for the terms y(iD) and y(iD+N+k) in equation (2):

$$y(iD) = \sum_m h(m)x(iD-m); \text{ and} \qquad (4)$$

$$y(iD+N+k) = \sum_u h(u)x(iD+N+k-u)$$

Equation (3) can be further refined by moving the "expectation operator", "E", inside the summation forming an autocorrelation function given by:

$$R_y(k) = \sum_m \sum_u h(m)h(u)E\{x(iD-m)x(iD+N+k-u)\} \qquad (5)$$

where N is an information block length of a transmitted signal X and k is an index used to count samples in the autocorrelation function $R_y(k)$ in increments, for example, of one, from 0 to an upper limit.

Backtracking somewhat, the use of an autocorrelation function to complete blind channel estimates of the impulse response of a channel is novel in and of itself.

Before the invention envisioned by the present inventor, those skilled in the art recognized that a DMT signal given by:

$$x(n) = \sum_i P_i(n-iD) \qquad (6)$$

was made up of samples, $x_{ij}$, and that these samples $x_{ij}$ could be characterized as being "white, identically and independently distributed" as indicated by the following equation:

$$E\{x_{i,j}x_{m,k}\} = \delta(i-m)\delta(j-k) \qquad (7)$$

where "δ" is a difference function and where δ(i,k)=1 when i=k, and δ(i,k)=0 all other times.

In sum, the first discovery envisioned by the present invention relates to methods and devices for completing blind channel estimates of the channel impulse response of a DMT signal using an autocorrelation function. The present invention does not stop there, however.

The next discovery envisioned by the present invention is a further simplification of the autocorrelation function given by equation (5). It is at this point that the present inventor realized that the cyclostationary nature of a DMT signal could be used to achieve a simplified autocorrelation function.

Equation (5) gives an autocorrelation function for the impulse response of a DMT signal. As mentioned above, a DMT signal is cyclostationary. Because of this, equation (5) may be simplified due to the "independence" property embodied in equation (7) where many cross-terms algebraically cancel out. This independence dictates that the term $E\{x(iD-m)x(iD+N+k-u)\}$ is nonzero only when sample indice m=0 and sample indice u=k. Taking this into account, equation (5) may be simplified into:

$$R_y(k) = h_0 h_k \quad (8)$$

By arbitrarily setting $h_0=1$ (which we can do because $h_0$ is a scaling constant), equation (8) becomes:

$$R_y(k) = h_k k = 1, \ldots, L-1 \quad (9)$$

As illustrated by equation (9), the present invention envisions estimating an impulse response, $h_k$, of a channel from an autocorrelation function, $R_y(k)$, of a received signal, $y(n)$.

In an illustrative embodiment of the invention, the expectation operation in equation (5) can be replaced by a time average which transforms equation (9) into:

$$H = \begin{bmatrix} \hat{h}_1 \\ \vdots \\ \hat{h}_{L-1} \end{bmatrix} = 1/K \sum_{i=0}^{K-1} y(iD) \begin{bmatrix} y(iD+N+1) \\ \vdots \\ y(iD+N+L-1) \end{bmatrix} h_0 = 1 \quad (10)$$

where "K" is the number of blocks averaging is carried out over, "y(iD)" is the first sample in a block, "y(iD+N-1) . . . y(iD+N+L-1)" are the last "L" samples of each block, and "$\hat{h}_1 \ldots \hat{h}_{L-1}$" are the channel impulse response estimates.

In effect, equation (10) comprises a simplified method of determining the impulse response of a channel.

So far, the present discussion has detailed two discoveries; the use of an autocorrelation function to complete blind channel estimates of the impulse response of a channel; and using the cyclostationary nature of a DMT signal to simplify the estimation process.

The present invention does not stop yet. In a real world channel, the impulse response is ever changing. Equation (10) must be modified somewhat to track the changes to a channel's impulse response. In an illustrative embodiment of the present invention, equation (10) can be converted to:

$$\hat{H}_{k+1} = (1-\alpha)\hat{H}_k + \alpha y(iD) \begin{bmatrix} y(iD+N+1) \\ \vdots \\ y(iD+N+L-1) \end{bmatrix} \quad (11)$$

Equation (11) gives an estimate of the impulse response of a channel at the end of the "i+1$^{st}$" block for a channel whose impulse response varies over time. In equation (11), "α" is an adjustment factor whose value is both nonzero, and at the same time, extremely close to zero. To adapt equation (10) to reflect changes in the impulse response over time, the present invention envisions substituting the time averaging operation in equation (10) with a "leaky" integrator to arrive at equation (11).

Towards the beginning of this discussion, it was noted that the impulse response of a channel could be estimated using a blind channel estimation method or through the use of a reference signal. FIG. 1 depicts a comparison of these two techniques.

For purposes of the comparison shown in FIG. 1, the solid line represents the known impulse response of a particular test channel estimated using a reference signal while the dotted line represents an estimate of the impulse response of the same test channel using equation (10) of the present invention. As shown in FIG.1, the impulse response estimates generated by the present invention closely correlate with the known impulse responses of the channel. For purposes of the experimental comparison shown in FIG. 1 the test channel utilized was a twisted pair copper wire which measured 8,000 feet in length. This length was selected because it represents the approximate length between a consumer, or user of a DSL modem\line, and a telephone company central office. The gauge of the copper wire used was 26 AWG.

The autocorrelation function given by equation (5) and the impulse response estimates given by equations (10) and (11) can be embodied in devices, programmable mediums and methods envisioned by the present invention.

Figure 2A:
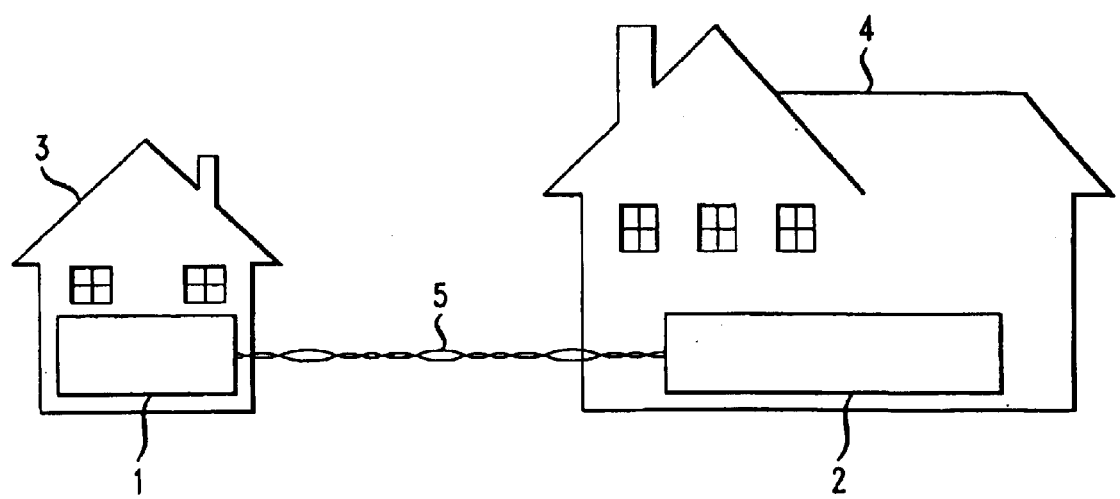
FIG. 2a shows a block diagram of a local loop comprising a device adapted to complete blind channel estimates of the channel impulse response for a DMT signal according to one embodiment of the present invention.

For example, FIG. 2a shows a typical connection, or local loop, between a user's home or business (hereafter collectively referred to as "premise") 3 and a telephone company central office 4. Connecting the two is a twisted pair copper wire 5 adapted to send both voice and data signals.

Within the central office 4 a first DMT transceiver 2 is installed; a second DMT transceiver 1 is installed in the user's premise 3. As shown in FIG. 2a, both transceivers are connected together via the copper wire 5.

The DMT transceivers 1,2 comprise devices which are adapted to complete blind channel estimates of a channel, e.g., the wire 5, for DMT signals which are exchanged between transceivers 1,2 via wire 5.

Figure 2B:
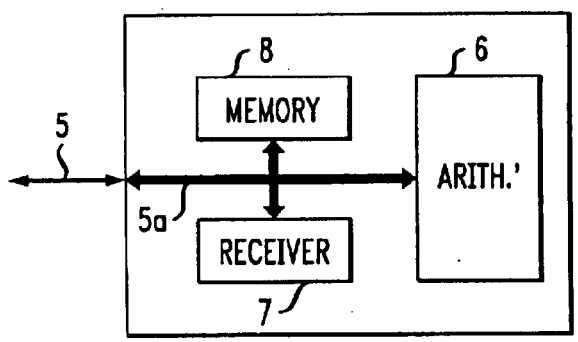
FIG. 2b shows an exploded view of a device shown in FIG. 2a according to one embodiment of the present invention.

In more detail, FIG. 2b shows an exploded view of a transceiver. In an illustrative example of the invention, each transceiver 1,2 comprises an arithmetic unit or means 6 adapted to complete blind channel estimates of an impulse response of the channel 5 for a DMT signal using an autocorrection function, for example, a function given by equation (5). In addition, the arithmetic unit of each transceiver can be further adapted to complete such estimates of an impulse response of the channel 5 using an impulse response defined by equations (10) or (11). In still another embodiment of the invention, each arithmetic unit can be further adapted to estimate an impulse response of the channel 5 using an autocorrection function given by equation (5), an impulse response defined by equation (10) and an impulse response defined by equation (11). In short, each transceiver 1,2 can be adapted to carry out the operations embodied in equations (1) through (11), respectively, and the intermediate operations related to each equation. The impulse response estimates yielded from transceivers 1,2 are useful, concrete and tangible estimates which are essential to maintain the integrity of the connection between the customer's premise 3 and telephone central office 4.

FIG. 2b also shows receiving unit or means 7 and memory unit or means 8. Each transceiver 1,2 may optionally comprise one or both of these additional units. The receiving unit 7 can be adapted to receive a DMT signal via channel 5 which it then passes on to arithmetic unit 6 for processing and the like. The memory unit 8 can be adapted to store, among other things, an autocorrelation function, such as that defined by equation (5). In addition, the memory unit 8 can be further adapted to store the impulse response of channel 5 defined by equation (10) or equation (11) or both.

Though the devices 1,2 are shown as DMT transceivers the invention is not so limited. In alternative embodiments of the invention the devices 1,2 may comprise DMT modems, DSL modems, digital signal processors ("DSPs"), DSP chipsets or fixed point arithmatic circuitry; the last three are commonly found in larger devices such as DSL modems.

Figure 3:
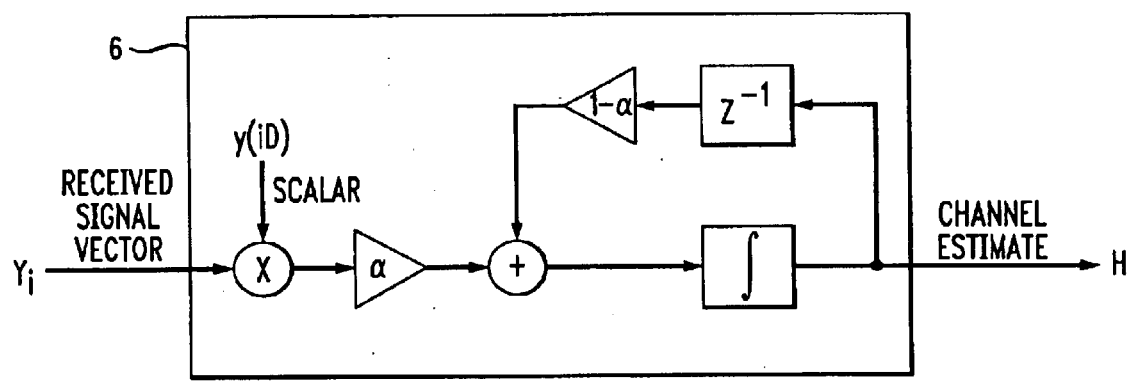
FIG. 3 shows a block diagram of functional elements needed to complete blind channel estimates of the channel impulse response for a DMT signal according to one embodiment of the present invention.

The present inventor feels it may be helpful, in order to gain an understanding of the present invention, to further explain the functions of an arithmetic unit which is involved in the estimation of a channel response. For example, FIG. 3 shows a block diagram of an arithmetic unit 6 comprising functional elements needed to complete blind channel estimates of the impulse response of a time-varying channel defined by equation (11) according to one embodiment of the present invention. The arithmetic unit 6 may comprise fixed point arithmetic circuitry which can be made part of a device such as a DMT transceiver, DMT modem, DSL modem, DSP, or DSP chipset to give just a few examples.

One example of how the unit 6 in FIG. 3 operates is as follows. Last "L" samples of a received signal vector, $Y_i$, are input into the unit 6 along with the first sample in a block of a DMT signal "y(iD)". This sample is then multiplied (the "$\otimes$" symbol in this case indicates multiply) by the adjustment factor "$\alpha$". The result produced by this multiplication is integrated and output as an estimate of the impulse response "H" of a channel. To take into account the time-varying nature of the channel itself, an offset "$1-\alpha$" is added to each subsequent sample of received signal, $Y_i$. The offset is generated using a delay "$Z^{-1}$".

Figure 4:
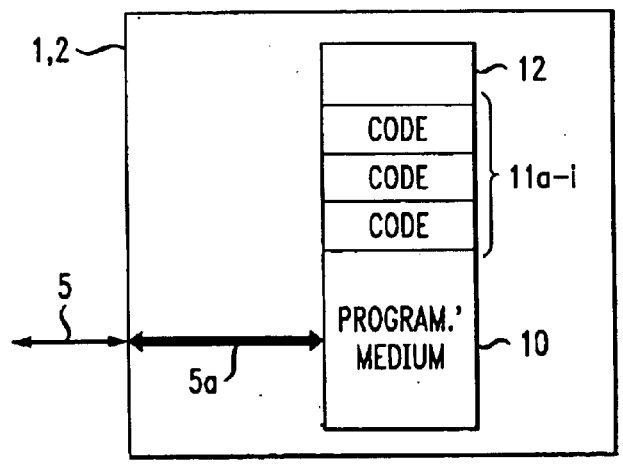
FIG. 4 shows a block diagram of a programmable device adapted to complete blind channel estimates of the channel impulse response for a DMT signal according to one embodiment of the present invention.

So far the discussion has centered on devices or hardware capable of carrying out the inventions envisioned by the present inventor. Most, if not all, of the functions and features discussed above, including those related to FIG. 3, can be realized in software/firmware as well. FIG. 4 shows programmable medium or program means 10 comprising program code or code means 11*a–i* (where "i" is the last block of code making up programmable medium 10) adapted to complete blind channel estimates of an impulse response of the channel 5 for a DMT signal using an autocorrection function, for example, a function given by equation (5). As with an arithmetic unit, the programmable medium 10, and therefore program code 11*a–i*, can be further adapted to complete estimates of an impulse response of the channel 5 using an impulse response defined by equations (10) or (11). In still another embodiment of the invention, the medium 10 can be further adapted to estimate an impulse response of the channel 5 using an autocorrection function given by equation (5), an impulse response defined by equation (10) and an impulse response defined by equation (11). In short, the medium 10 can be adapted to carry out the operations embodied in equations (1) through (11), respectively, and the intermediate operations related to each equation.

In alternative embodiments of the present invention, the medium 10 can also comprise a receiving section comprising program code 11*a–i* adapted to receive a digital form of a DMT signal via channel 5 which is then used to estimate the impulse response of the channel 5, and a memory section 12 adapted to store at least an autocorrelation function defined by equation (5), the impulse response of channel 5 defined by equation (10), equation (11) or some combination of all three.

The programmable medium 10 in FIG. 4 is shown as being a part of DMT transceiver 1 or 2. This is by way of example only; the invention is not so limited. In alternative embodiments of the invention the medium may be a part of a DMT or DSL modem or the like. Overall, the medium 10 can be adapted to control the blind channel estimation of the impulse response of a transceiver, modem or the like.

Programmable medium 10 and program code 11*a–i* can also be adapted to carry out the functions and features performed by the functional elements shown in FIG. 3.

Some illustrative examples of medium 10 are at least one DSP, floppy disk, optical disk or other electronic storage device.

Throughout the discussion immediately above reference was made to program code 11*a–i*. It should be understood that, as used in the above description and claims that follow, the words "program code" mean one or more lines of program code. That is, the present invention envisions embodiments where the features and functions of the inventions described above are carried out using one or more lines of program code. It should also be understood that the words "programmable medium" mean one or more mediums, such as a DSP, microprocessor, memory device, an electronic storage device or some combination of these. The present invention envisions embodiments where one or more lines of program code 11*a–i* resides on one or more programmable mediums 10. Typically, regardless of the number of lines of program code 11*a–i*, the programmable medium 10 is made a part of a larger device, such as a DMT or DSL modem or the like.

Though the above discussion has focused on devices and mediums for carrying out the inventions envisioned by the present inventor, the present invention also envisions methods for carrying out the same.

The above description is an attempt to explain, using examples, the features and functions of the present invention. With this in mind, it should be understood that changes and variations may be made without departing from the spirit and scope of this invention. For example, additional embodiments of the present invention may be envisioned which combine both hardware and software components to carry out the features and functions of the present invention.

It is to be further understood that other changes and variations may be made without departing from the spirit and scope of this invention as defined by the claims that follow.

We claim:

1. A DMT modem comprising:
an arithmetic unit for estimating a channel impulse response for a DMT signal using an autocorrelation function defined by:

$$R_y(k) = \sum_m \sum_u h(m)h(u)E\{x(iD - m)x(iD + N + k - u)\}$$

where
h is an impulse response, x is and input signal, E is the expectation operator, D is a transmission block length, N is an information block length and k is an index used to count samples in the autocorrelation function $R_y(k)$ in increments from 0 to an upper limit.

2. The modem as in claim 1 wherein the arithmetic unit further estimates the channel impulse response using an autocorrelation function of a received signal.

3. The modem as in claim 2 wherein the impulse response comprises a time-average.

4. The modem as in claim 3 wherein the impulse response comprises a first sample in a block of a DMT signal and last "L" samples of each block in the DMT signal.

5. The modem as in claim 4 wherein the arithmetic unit further estimates a channel impulse response defined by:

$$\hat{H} = \begin{bmatrix} \hat{h}_1 \\ \vdots \\ \hat{h}_{L-1} \end{bmatrix} = 1/K \sum_{i=0}^{K-1} y(iD) \begin{bmatrix} y(iD+N+1) \\ \vdots \\ y(iD+N+L-1) \end{bmatrix} h_0 = 1$$

where K is a number of blocks averaging is carried out over, y(iD) is the first sample in a block, y(iD+N+1) ... y(iD+N+L-1) are the last "L" samples of each block and $\hat{h}_1 \ldots \hat{h}_{L-1}$ are the channel impulse response estimates.

6. The modem as in claim 5 wherein the channel comprises a time-varying channel and the arithmetic unit further estimates a channel impulse response defined by:

$$\hat{H}_{k+1} = (1-\alpha)\hat{H}_k + \alpha y(iD) \begin{bmatrix} y(iD+N+1) \\ \vdots \\ y(iD+N+L-1) \end{bmatrix}$$

where "α" is an adjustment factor whose value is both nonzero and at the same time, extremely close to zero.

7. The modem as in claim 1 wherein the arithmetic unit further estimates an impulse response of a channel defined by:

$$\hat{H} = \begin{bmatrix} \hat{h}_1 \\ \vdots \\ \hat{h}_{L-1} \end{bmatrix} = 1/K \sum_{i=0}^{K-1} y(iD) \begin{bmatrix} y(iD+N+1) \\ \vdots \\ y(iD+N+L-1) \end{bmatrix} h_0 = 1$$

where K is a number of blocks averaging is carried out over, y(iD) is the first sample in a block, y(iD+N+1) ... y(iD+N+L-1) are the last "L" samples of each block and $\hat{h}_1 \ldots \hat{h}_{L-1}$ are the channel impulse response estimates.

8. The modem as in claim 1 wherein the channel comprises a time-varying channel and the arithmetic unit further estimates a channel impulse response defined by:

$$\hat{H}_{k+1} = (1-\alpha)\hat{H}_k + \alpha y(iD) \begin{bmatrix} y(iD+N+1) \\ \vdots \\ y(iD+N+L-1). \end{bmatrix}$$

where "α" is an adjustment factor whose value is both nonzero and at the same time, extremely close to zero.

9. The modem as in claim 1 further comprising a receiving unit for receiving the DMT signal.

10. The modem as in claim 1 further comprising a memory unit for storing at least the autocorrelation function.

11. The modem as in claim 1 wherein the modem comprises a DSL modem.

12. The modem as in claim 1 wherein the modem comprises a digital signal processor.

13. The modem as in claim 1 wherein the modem comprises a digital signal processor chip set.

14. The modem as in claim 1 wherein the modem comprises fixed point arithmetic circuitry.

15. A DMT modem comprising:
an arithmetic unit for estimating a channel impulse response for a DMT signal defined by:

$$\hat{H}_{k+1} = (1-\alpha)\hat{H}_k + \alpha y(iD) \begin{bmatrix} y(iD+N+1) \\ \vdots \\ y(iD+N+L-1) \end{bmatrix}$$

where
y is a channel output, "α" is an adjustment factor whose value is both nonzero and at the same time, extremely close to zero, D is a transmission block length and N is an information block length.

16. The modem as in claim 15 further comprising a receiving unit for receiving the DMT signal.

17. The modem as in claim 15 further comprising a memory unit for storing at least an autocorrelation function.

18. The modem as in claim 15 wherein the modem comprises a DSL modem.

19. The modem as in claim 15 wherein the modem comprises a digital signal processor.

20. The modem as in claim 15 wherein the modem comprises a digital signal processor chip set.

21. The modem as in claim 15 wherein the modem comprises fixed point arithmetic circuitry.

22. A programmable medium for completing blind channel estimates of a channel impulse response for a DMT signal comprising:
program code for estimating a channel impulse response for a DMT signal using an autocorrelation function defined by:

$$R_y(k) = \sum_m \sum_u h(m)h(u)E\{x(iD-m)x(iD+N+k-u)\}$$

where
h is an impulse response, x is an input signal, E is the expectation operator, D is a transmission block length, N is an information block length and k is an index used to count samples in the autocorrelation function $R_y(k)$ in increments from 0 to an upper limit.

23. The medium as in claim 22 further comprising program code for estimating the channel impulse response using an autocorrelation function of a received signal.

24. The medium as in claim 23 wherein the impulse response comprises a time-average.

25. The medium as in claim 24 wherein the impulse response comprises a first sample in a block of a DMT signal and last "L" samples of each block in the DMT signal.

26. The medium as in claim 25 further comprising program code for estimating a channel impulse response defined by:

$$\hat{H} = \begin{bmatrix} \hat{h}_1 \\ \vdots \\ \hat{h}_{L-1} \end{bmatrix} = 1/K \sum_{i=0}^{K-1} y(iD) \begin{bmatrix} y(id+N+1) \\ \vdots \\ y(iD+N+N-1) \end{bmatrix} h_o = 1$$

where K is a number of blocks averaging is carried out over, y(iD) is the first sample in a block, y(iD+N+1) ... y(iD+N+L-1) are the last "L" samples of each block and $\hat{h}_1 \ldots \hat{h}_{L-1}$ are the channel impulse response estimates.

27. The medium as in claim 26 wherein the channel comprises a time-varying channel and the program further comprises program code for further estimating a channel impulse response defined by:

$$\hat{H}_{k+1} = (1-\alpha)\hat{H}_k + \alpha y(iD)\begin{bmatrix} y(iD+N+1) \\ \vdots \\ y(iD+N+L-1) \end{bmatrix}$$

where "α" is an adjustment factor whose value is both nonzero and at the same time, extremely close to zero.

28. The medium as in claim 22 further comprising program code for estimating a channel impulse response defined by:

$$H = \begin{bmatrix} \hat{h}_1 \\ \vdots \\ \hat{h}_{L-1} \end{bmatrix} = 1/K \sum_{i=0}^{K-1} y(iD) \begin{bmatrix} y(iD+N+1) \\ \vdots \\ y(iD+N+L-1) \end{bmatrix} h_o = 1$$

where K is a number of blocks averaging is carried out over, y(iD) is the first sample in a block, y(iD+N+1) ... y(iD+N+L−1) are the last "L" samples of each block and $\hat{h}_1$ ... $\hat{h}_{L-1}$ are the channel impulse response estimates.

29. The medium as in claim 22 wherein the channel comprises a time-varying channel and the program further comprises program code for estimating a channel impulse response defined by:

$$\hat{H}_{k+1} = (1-\alpha)\hat{H}_k + \alpha y(iD)\begin{bmatrix} y(iD+N+1) \\ \vdots \\ y(iD+N+L-1) \end{bmatrix}$$

where "α" is an adjustment factor whose value is both nonzero and at the same time, extremely close to zero.

30. The medium as in claim 22 further comprising a receiving section for receiving a digital form of the DMT signal.

31. The medium as in claim 22 further comprising a memory section for storing at least the autocorrelation function.

32. The medium as in claim 22 wherein the medium further controls a DMT modem.

33. The medium as in claim 22 wherein the medium further controls a DSL modem.

34. The medium as in claim 22 wherein the medium comprises a digital signal processor.

35. The medium as in claim 22 wherein the medium comprises at least one electronic storage device.

36. A programmable medium for completing blind channel estimates of a channel impulse response for a DMT signal comprising:

program code for estimating a channel impulse response for a DMT signal defined by:

$$\hat{H}_{k+1} = (1-\alpha)\hat{H}_k + \alpha y(iD)\begin{bmatrix} y(iD+N+1) \\ \vdots \\ y(iD+N+L-1) \end{bmatrix}$$

where
y is a channel output, "α" is an adjustment factor whose value is both nonzero and at the same time, extremely close to zero, D is a transmission block length and N is an information block length.

37. The medium as in claim 36 further comprising a receiving section for receiving a digital form of the DMT signal.

38. The medium as in claim 36 further comprising a memory section for storing at least an autocorrelation function.

39. The medium as in claim 36 wherein the medium further controls a DMT modem.

40. The medium as in claim 36 wherein the medium further controls a DSL modem.

41. A method for completing blind channel estimates of a channel impulse response for a DMT signal comprising:

estimating a channel impulse response for a DMT signal using an autocorrelation function defined by:

$$R_y(k) = \sum_m \sum_u h(m)h(u)E\{x(iD-m)x(iD+N+k-u)\}$$

where
h is an impulse response, x is an input signal, E is the expectation operator, D is a transmission block length, N is an information block length and k is an index used to count samples in the autocorrelation function $R_y(k)$ in increments from 0 to an upper limit.

42. The method as in claim 41 further comprising estimating the channel impulse response using an autocorrelation function of a received signal.

43. The method as in claim 42 wherein the impulse response comprises a time-average.

44. The method as in claim 43 wherein the impulse response comprises a first sample in a block of a DMT signal and last "L" samples of each block in the DMT signal.

45. The method as in claim 44 further comprising estimating a channel impulse response defined by:

$$\hat{H} = \begin{bmatrix} \hat{h}_1 \\ \vdots \\ \hat{h}_{L-1} \end{bmatrix} = 1/K \sum_{i=0}^{K-1} y(iD) \begin{bmatrix} y(iD+N+1) \\ \vdots \\ y(iD+N+L-1) \end{bmatrix} h_o = 1$$

where K is a number of blocks averaging is carried out over, y(iD) is the first sample in a block, y(iD+N+1) ... y(iD+N+L−1) are the last "L" samples of each block and $\hat{h}_1$ ... $\hat{h}_{L-1}$ are the channel impulse response estimates.

46. The method as in claim 45 wherein the channel comprises a time-varying channel, the method further comprising estimating a channel impulse response defined by:

$$\hat{H}_{k+1} = (1-\alpha)\hat{H}_k + \alpha y(iD)\begin{bmatrix} y(iD+N+1) \\ \vdots \\ y(iD+N+L-1) \end{bmatrix}$$

where "α" is an adjustment factor whose value is both nonzero and at the same time, extremely close to zero.

47. The method as in claim 41 further comprising estimating a channel impulse response defined by:

$$\hat{H} = \begin{bmatrix} \hat{h}_1 \\ \vdots \\ \hat{h}_{L-1} \end{bmatrix} = 1/K \sum_{i=0}^{K-1} y(iD) \begin{bmatrix} y(iD+N+1) \\ \vdots \\ y(iD+N+L-1) \end{bmatrix} h_o = 1$$

where K is a number of blocks averaging is carried out over, y(iD) is the first sample in a block, y(iD+N+1) ... y(iD+

N+L−1) are the last "L" samples of each block and $\hat{h}_1 \ldots \hat{h}_{L-1}$ are the channel impulse response estimates.

48. The method as in claim 41 wherein the channel comprises a time-varying channel, the method further comprising estimating a channel impulse response defined by:

$$\hat{H}_{k+1} = (1-\alpha)\hat{H}_k + \alpha y(iD) \begin{bmatrix} y(iD+N+1) \\ \vdots \\ y(iD+N+L-1) \end{bmatrix}$$

where "α" is an adjustment factor whose value is both nonzero and at the same time, extremely close to zero.

49. The method as in claim 41 further comprising receiving the DMT signal.

50. The method as in claim 41 further comprising storing at least the autocorrelation function.

51. A method for completing blind channel estimates of a channel impulse response for a DMT signal comprising:

estimating a channel impulse response for a DMT signal defined by:

$$\hat{H}_{k+1} = (1-\alpha)\hat{H}_k + \alpha y(iD) \begin{bmatrix} y(iD+N+1) \\ \vdots \\ y(iD+N+L-1) \end{bmatrix}$$

where y is a channel output, "α" is an adjustment factor whose value is both nonzero and at the same time, extremely close to zero, D is a transmission block length and N is an information block length.

52. The method as in claim 51 further comprising receiving the DMT signal.

53. The method as in claim 51 further comprising storing at least an autocorrelation function.

* * * * *